United States Patent [19]

Dziark

[11] Patent Number: 4,536,540
[45] Date of Patent: Aug. 20, 1985

[54] SCAVENGERS FOR AMMONIA IN RTV COMPOSITIONS

[75] Inventor: John J. Dziark, Ballston Spa, N.Y.

[73] Assignee: General Electric Company, Waterford, N.Y.

[21] Appl. No.: 628,121

[22] Filed: Jul. 9, 1984

Related U.S. Application Data

[63] Continuation of Ser. No. 519,621, Aug. 2, 1983, abandoned.

[51] Int. Cl.$^3$ .............................................. C08K 3/02
[52] U.S. Cl. ...................................... 524/701; 528/33; 528/34; 528/21; 528/901; 524/703; 524/789
[58] Field of Search ....................... 524/701, 703, 789; 528/33, 34, 21, 901

[56] References Cited

U.S. PATENT DOCUMENTS

| | | |
|---|---|---|
| 3,499,859 | 3/1970 | Matherly .............................. 524/701 |
| 4,395,526 | 7/1983 | White et al. .......................... 528/18 |
| 4,417,042 | 11/1983 | Dziark .................................... 528/18 |
| 4,461,867 | 7/1984 | Suprenant ............................. 528/33 |
| 4,472,551 | 9/1984 | White et al. .......................... 528/33 |

Primary Examiner—Melvyn I. Marquis
Attorney, Agent, or Firm—Gary L. Loser

[57] ABSTRACT

A stable, one-package, silicone RTV composition convertible to a tack-free elastomer comprising:
(1) a polydiorganosiloxane base polymer,
(2) an effective amount of condensation catalyst,
(3) a stabilizing amount of a silicon-nitrogen compound for scavenging hydroxy radicals which releases ammonia as a by-product of the scavenging reaction, and
(4) an effective amount of scavenger for said ammonia by-product selected from the group consisting of molecular sieves, acids and mixtures thereof.

40 Claims, No Drawings

SCAVENGERS FOR AMMONIA IN RTV COMPOSITIONS

This application is a continuation of application Ser. No. 519,621, filed 08/02/83 now abandoned.

BACKGROUND OF THE INVENTION

Recently a shelf-stable, fast curing, one component, alkoxy-functional, room temperature vulcanizable (RTV) composition was disclosed in the patent of White et al., U.S. Pat. No. 4,395,526, and assigned to the same assignee as the present invention. Basically, White et al. disclose that moisture curable polyalkoxy-terminated organopolysiloxane RTV compositions can be prepared by combining (1) a silanol-terminated polydiorganosiloxane base polymer; (2) a crosslinking silane; (3) an effective amount of certain silane scavengers for chemically combined hydroxy radicals; and (4) an effective amount of a condensation catalyst. The scavenger, which can be either a separate compound or part of the alkoxy-functional crosslinking agent, has a functionality selected from the group consisting of oximato, carbamato, enoxy, amido, amino, imidato, ureido, isocyanato and thioisocyanato. The disclosure of White et al. is incorporated herein by reference.

Other scavenger compositions that can be utilized in the White et al. composition are disclosed in copending patent applications by R. T. Swiger and J. E. Hallgren, Ser. No. 476,000, filed Mar. 17, 1983; G. M. Lucas, Ser. No. 464,443, filed Feb. 7, 1983 now U.S. Pat. No. 4,503,209; R. H. Chung, Ser. No. 338,518, filed Jan. 11, 1982 now U.S. Pat. No. 4,424,157; and T. D. Mitchell, Ser. No. 462,949, filed Feb. 1, 1983 now U.S. Pat. No. 4,483,972. However, of particular interest are the silazane and silicon-nitrogen polymer scavengers disclosed in copending patent applications by J. J. Dziark, Ser. No. 349,695, filed Feb. 17, 1982 and now U.S. Pat. No. 4,417,042, and R. H. Chung et al., Ser. No. 428,038, filed Sept. 28, 1982. The disclosures of the Dziark and Chung et al. applications are also incorporated by reference into the instant application.

Dziark discloses that the silane scavenger for hydroxy functional groups of White et al. can be replaced with a scavenger selected from silicon-nitrogen compounds selected from the group consisting of:

(A) silicon-nitrogen compounds of the formula

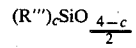

where Y is selected from R''' and R''N— and (B) silicon-nitrogen polymers comprising (1) from 3 to 100 mole percent chemically combined structural units selected from the group consisting of units having the formula:

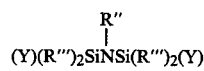

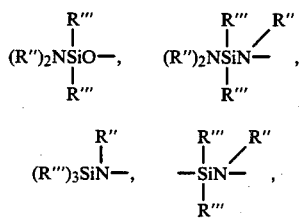

and (2) from 0 to 97 mole percent chemically combined structural units of the formula

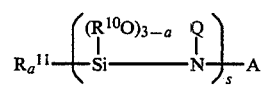

and mixtures thereof where the silicon atoms of said silicon-nitrogen polymer are joined to each other by a member selected from an SiOSi linkage and an Si N R'' Si linkage, the free valences of said silicon atoms, other than those joined to oxygen to form a siloxy unit and nitrogen to form a silazy unit, are joined to a member selected from an R''' radical and an (R'')$_2$N radical, and where the ratio of the sum of said R''' radicals and said (R')$_2$N radicals to the silicon atoms of said silicon-nitrogen polymer has a value of 1.5 to 3, inclusive, R'' is selected from the group consisting of hydrogen, C$_{1-12}$ monovalent hydrocarbon radicals and C$_{1-12}$ fluoroalkyl radicals, R''' is selected from the group consisting of hydrogen, monovalent hydrocarbon radicals and fluoroalkyl radicals, and c is a whole number from 0 to 3 inclusive. According to Dziark, a preferred scavenger compound is hexamethyldisilazane.

Chung et al. provided an improvement over Dziark in that silazane compounds and silicon-nitrogen polymers were provided which could be utilized as integrated scavengers and crosslinkers. The scavengers disclosed by Chung et al. are selected from the group consisting of non-cyclic silyl nitrogen compounds of the formula

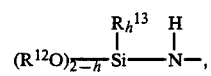

and cyclic silyl nitrogen compounds having at least one unit of the formula

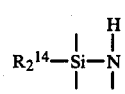

any remaining units having the formula $$R_2{}^{14}-\underset{|}{\overset{H}{\underset{|}{Si}}}-\underset{|}{\overset{|}{N}}$$

where R$^{10}$ is a C$_{1-18}$ aliphatic organic radical selected from the group consisting of alkyl, alkylether, alkylester, alkylketone, alkylcyano and aryl; R$^{11}$ is a C$_{1-18}$ monovalent substituted or unsubstituted hydrocarbon radical, Q is a radical selected from the group consisting of hydrogen C$_{1-18}$ monovalent substituted or unsubstituted hydrocarbon radicals and radicals of the formula

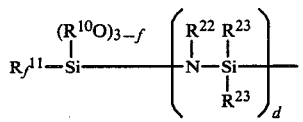

where $R^{10}$ and $R^{11}$ are as previously defined; a varies from 0 to 2, f varies from 0 to 3, h is 0 or 1, s is a whole number from 1 to 10, d is a whole number from 1 to 5, A is selected from the group consisting of hydrogen, $C_{1-18}$ monovalent substituted or unsubstituted hydrocarbon radicals and radicals of the formula

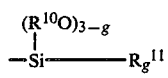

where $R^{10}$ and $R^{11}$ are as previously defined; g varies from 0 to 3, $R^{12}$ is the same as $R^{10}$, $R^{13}$ is the same ar $R^{11}$ and $R^{14}$ is the same as $R^{11}$. In each instance the scavenger of Chung et al. must have at least one hydrocarbonoxy group so that the scavenger functions as an integrated scavenger-crosslinker.

One disadvantage of the hydroxy scavengers of Dziark and Chung et al. is that ammonia is produced as a by-product of the scavenging reaction. As a result, the head space of bulk containers, such as 55 gallon drums, may contain substantial amounts of ammonia. This accumulation of ammonia can be so great as to cause severe eye and throat irritation when the drum is opened.

Accordingly, it is an object of the present invention to provide one-component, alkoxy functional silicone RTV compositions in which ammonia by-product is substantially avoided by reaction with an ammonia scavenging compound.

It is another object of the present invention to provide a method for producing silicone RTV compositions which include scavengers for ammonia by-product.

These and other objects and advantages of the present invention will be obvious from the following detailed description.

SUMMARY OF THE INVENTION

In accordance with the broadest aspects of the present invention there is provided a stable, one-package, silicone RTV composition convertible to a tack-free elastomer, comprising:

(A) a polydiorganosiloxane base polymer wherein the silicon atom at each chain end is terminated with at least two alkoxy radicals;
(B) an effective amount of condensation catalyst;
(C) a stabilizing amount of a silicon-nitrogen compound for scavenging hydroxy radicals which releases ammonia as a by-product of the scavenging reaction; and
(D) an effective amount of a scavenger for said ammonia by-product selected from the group consisting of molecular sieves, acids, and mixtures thereof.

DESCRIPTION OF THE INVENTION

One aspect of the present invention provides a stable, one-package, substantially anhydrous and substantially acid-free, room temperature vulcanizable organopolysiloxane composition stable under ambient conditions in the substantial absence of moisture over an extended period of time, and convertible to a tack-free elastomer, comprising:

(A) a polydiorganosiloxane base polymer wherein the silicon atom at each chain end is terminated with at least two alkoxy radicals;
(B) an effective amount of condensation catalyst;
(C) a stabilizing amount of a silicon-nitrogen compound for scavenging hydroxy radicals which releases ammonia as a by-product of the scavenging reaction; and
(D) an effective amount of a scavenger for said ammonia by-product selected from the group consisting of molecular sieves and acids.

In another aspect of the present invention there is provided an RTV composition which is convertible to a tack-free elastomer comprises:

(A) a silanol-terminated polydiorganosiloxane base polymer;
(B) an effective amount of condensation catalyst;
(C) a stabilizing amount of a silicon-nitrogen compound for scavenging hydroxy radicals which releases ammonia as a by-product of the scavenging reaction;
(D) an effective amount of a crosslinking silane of the formula

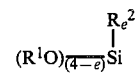

where $R^1$ is a $C_{1-18}$ aliphatic organic radical selected from the group consisting of alkyl, alkylether, alkylester, alkylketone and alkylcyano or a $C_{7-13}$ monovalent substituted or unsubstituted hydrocarbon radical; and e equals 0 or 1;
(E) an effective amount of a co-catalyst or curing accelerator selected from the group consisting of substituted guanidines, amines, and mixtures thereof; and
(F) an effective amount of a scavenger for said ammonia by-product of the hydroxy scavenger selected from the group consisting of molecular sieves, acids and mixtures thereof.

The polydiorganosiloxane base polymer can be either silanol endstopped or alkoxy endstopped, both of which are well known in the art and easily prepared by the skilled artisan. For more detailed information the reader is referred to the disclosure of White et al. and the references cited therein.

With respect to the condensation catalyst, such catalysts are also well known in the art and a rather exhaustive list is provided in the disclosure of White et al. It should be noted that tin compounds are the preferred condensation catalysts and most preferably is dibutyltindiacetate.

The scavenger for hydroxy functional groups employed in the practice of the present invention must be a silicon-nitrogen compound or polymer which releases ammonia as a by-product of the scavenging reaction. For purposes of the present invention the term "ammonia" includes similar compounds such as amines and amides. Accordingly, the preferred scavengers for hydroxy functional groups are those within the scope of the patent applications of Dziark, Ser. No. 349,695, filed Feb. 17, 1982, and now U.S. Pat. No. 4,417,042, and Chung et al., Ser. No. 428,038, filed Sept. 29, 1982.

Generally Dziark teaches that a suitable silicone scavenger compound for hydroxy functional groups is a silicon-nitrogen compound selected from the group consisting of (A) a silicon-nitrogen compound having the formula

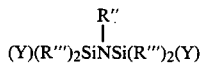

where Y is selected from R''' and R''$_2$N— and (B) a silicon-nitrogen polymer comprising (1) from 3 to 100 mole percent chemically combines structural units selected from the group consisting of units having the formula

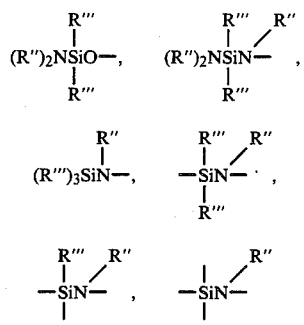

and (2) from 0 to 97 mole percent chemically combined structural units represented by the formula

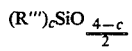

where the silicon atoms of said silicon-nitrogen polymer are joined to each other by a member selected from an SiOSi linkage and an SiNR''Si linkage, the free valences of said silicon atoms other than those joined to oxygen to form a siloxy unit and nitrogen to form a silazy unit are joined to a member selected from an R''' radical and an R''$_2$N radical, and where the ratio of the sum of said R''' radicals and said R''$_2$N radicals to the silicon atoms of said silicon-nitrogen polymer has a value of 1.5 to 3 inclusive, and R'' is a member selected from the group consisting of hydrogen, monovalent hydrocarbon radicals and fluoroalkyl radicals, R''' is a member selected from the group consisting of hydrogen, monovalent hydrocarbon radicals and fluoroalkyl radicals, and c is a whole number equal to 0 to 3 inclusive.

Chung et al. recognized that the scavenger for hydroxy functional groups provided by Dziark could only be used as a scavenger and therefore provided silicon-nitrogen compounds which could be utilized as an integrated scavenger and crosslinker. In its broadest aspects the scavenger for hydroxy radicals provided by Chung et al. is selected from the group consisting of non-cyclic silyl-nitrogen compounds of the formula

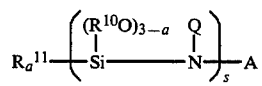

and cyclic silyl nitrogen compounds having at least one unit of the formula

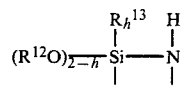

and the rest of the units, if any, having the formula

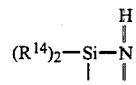

where $R^{10}$ and $R^{12}$ are $C_{1-8}$ aliphatic organic radicals selected from the group consisting of alkyl, alkylether, alkylester, alkylketone, alkylcyano and aryl; $R^{11}$, $R^{13}$ and $R^{14}$ are $C_{1-8}$ monovalent substituted or unsubstituted hydrocarbon radicals, a varies from 0 to 2, h is 0 or 1, s varies from 1 to 25, Q is selected from the group consisting of hydrogen, $C_{1-8}$ hydrocarbon radicals and radicals of the formula

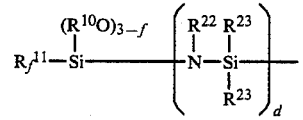

where d is a whole number that varies from 1 to 25 and f varies from 0 to 3; $R^{22}$ is selected from the group consisting of hydrogen and $C_{1-8}$ monovalent hydrocarbon radicals, and $R^{23}$ is independently selected from $C_{1-8}$ monovalent hydrocarbon radicals and hydrocarbonoxy radicals, A is selected from the group consisting of hydrogen and $C_{1-8}$ monovalent substituted and unsubstituted hydrocarbon radicals and radicals of the formula

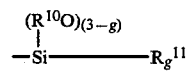

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, g varies from 0 to 3, and in the above scavengers there is at least one hydrocarbonoxy group in the molecule.

A shortcoming of the scavengers for hydroxy-functional groups of Dziark and Chung et al. is that ammonia is formed as a by-product of the scavenging reaction. This ammonia tends to accumulate in the head space of the container, particularly bulk containers such as 55 gallon drums and 5 gallon pails, in quantities sufficient to cause severe eye and throat irritation when the container is opened. This is a relatively minor problem with smaller containers such as caulkers as the ammonia is merely offensive. Nevertheless, even this problem is avoided by the present invention.

The present invention is based on the discovery that an effective amount of scavenger for ammonia by-product can be added to eliminate such offensive and irritating ammonia by-product. In one embodiment contemplated for the present invention the ammonia scavenger is added to the RTV composition and mixed therein. The uniformly dispersed scavenger then reacts with the ammonia almost immediately after it is produced. In another and more preferred embodiment which is especially suitable for use in bulk containers, the scavenger for ammonia is placed in the airspace above the RTV composition rather than being mixed into the composition. In this embodiment the ammonia first migrates to the airspace of the container before it is eliminated by the ammonia scavenger of the present invention. For convenience and ease of disposal the ammonia scavenger can be placed on top of a suitable material such as a plastic or cloth sheet which covers the uncured sealant.

Broadly stated the ammonia scavenger of the present invention can be a molecular sieve, an acid or mixtures thereof. The molecular sieve scavengers can be powdered or pelletized and preferably are from about 2 to about 15 Angstroms, more preferably from about 3 to about 13 Angstroms, and most preferably are from about 4 to about 5 Angstroms.

While the acid scavenger can be any acid which will react with ammonia, in practice such acid scavenger typically will be a solid compound rather than a liquid so as to facilitate easy handling and disposal of the scavenger. Of course, the preferred acid scavengers for ammonia are inexpensive, for example, boric acid or oxalic acid.

There is no particular amount of scavenger for ammonia which must be utilized, rather it can easily be determined by the artisan without undue experimentation. In general the amount of ammonia scavenger should be sufficient to substantially avoid the offensive and irritating amounts of ammonia by-product produced as a result of the hydroxy-scavenging reaction and preferably will eliminate all of such ammonia by-product. Experience thus far has shown that as little as one pound of 4 Angstrom molecular sieve or one pound of boric acid per 55 gallon drum will substantially eliminate the ammonia by-product.

As indicated hereinabove, when the base polymer is silanol terminated it may be necessary to include an effective amount of curing accelerator so as to endcap such polymer with alkoxy groups. Curing accelerators used in the practice of the present invention are selected from the group consisting of substituted guanidines, amines and mixtures thereof. The reader interested in obtaining additional information relating to such compounds is referred to White et al. and U.S. Pat. Nos. 4,180,642 and 4,248,993 to Takago, both of which are incorporated herein by reference.

It should also be noted that in those instances where the scavenger for hydroxy-functional groups does not also function as a crosslinking agent, it is necessary to include an effective amount of a crosslinking silane of the formula

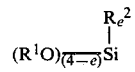

where $R^1$ is a $C_{1-8}$ aliphatic organic radical selected from the group consisting of alkyl, alkylether, alkylester, alkylketone and alkylcyano or a $C_{7-13}$ aralkyl radical, $R^2$ is a $C_{1-13}$ monovalent substituted or unsubstituted hydrocarbon radial and e equals 0 or 1. For further information regarding alkoxy-functional crosslinking silanes the reader is again referred to the disclosure of White et al.

Of course, various fillers can be incorporated into the composition of the present invention, for example, titanium dioxide, zirconium silicate, silica aerogel, iron oxide, diatomaceous earth, fumed silica, carbon black, precipitated silica, glass fibers, polyvinylchloride, ground quartz and calcium carbonate. The amount of filler utilized can be varied within wide limits in accordance with the intended use. For example, in some sealant applications the curable composition can be used free of filler whereas in other applications, such as utilizing the curable composition for making binder material, as much as 700 parts or more of filler per 100 parts of organopolysiloxane on a weight basis, can be employed. Preferably, the filler is present in an amount ranging from 10 to 300 parts per 100 parts organopolysiloxane. Furthermore, adhesion promoters, sag control agents, plasticizers and the like can be included in the composition of the present invention.

So that those skilled in the art might be better able to practice the present invention, the following examples are given by way of illustration and not by way of limitation.

EXAMPLES

EXAMPLE 1

For this series of experiments 55 gallon drums of ammonia producing sealant were used. The drums were put into test immediately after production. Two, four and eight pounds of both powdered and pelletized (1/16" pellets) of a 5 Å molecular sieve were placed in 6 different drums of the material. For convenience and ease of disposal a larger plastic bag was first added to the inside of the drum above a plastic sheet which covered the uncured sealant. As a control a seventh drum with no additive was also set aside.

These drums were sealed in the usual manner and stored for various lengths of time. They were then opened, the odor of ammonia noted, and then resealed. A scale of 1–5 was used to rate each drum, 1 being no noticeable odor of ammonia, 5 being a very significant offensive and irritating odor of ammonia.

Table I lists the results of this study. As can be seen from the study, as little as 2 pounds of 5 Å molecular sieves was effective at significantly reducing or even eliminating the irritating ammonia gas build-up.

TABLE I

| | Ammonia Scavengers | | | |
|---|---|---|---|---|
| Odor: 5 = Control | | | | |
| | #5Å Mol. | 1 = No noticeable ammonia | | |
| Drum # | Sieve (type) | 12 days | 27 days | 41 days | 187 days |
| 1 | 2 (powder) | — | 1 | — | 1 |
| 2 | 2 (pellet) | — | 1 | 1 | 2 |
| 3 | 4 (powder) | 4 | 1 | 1 | 1 |
| 4 | 4 (pellet) | 4 | 1 | — | 1 |
| 5 | 8 (powder) | 2 | 1 | 1 | — |
| 6 | 8 (pellet) | 2 | 1 | — | — |
| 7 | — Control | 5 | 5 | 5 | 5 |

EXAMPLE 2

For this experiment freshly prepared 55 gallon drums of sealant were used. This product contained hexamethyldisilazane which, upon reaction with reactive OH groups, generated ammonia.

Into each of 3 drums was placed:

(1) one pound of boric acid;
(2) one cloth bag containing one pound of 4 Å molecular sieves; and,
(3) three cloth bags each containing one pound of 4 Å molecular sieves. Again a control was also monitored for comparison.

The materials were placed on top of the plastic liner which was placed on the uncured sealant. The headspace was periodically monitored for ammonia buildup by removing a small sample of the headspace via a syringe through a rubber septum and titrating that sample for ammonia. Table II lists the results. Again, all materials tested were effective at reducing the ammonia buildup in the drum.

TABLE II

| Drum # | Adsorbent (lbs.) | % Ammonia in Headspace | | | |
|---|---|---|---|---|---|
| | | 1 day | 15 day | 25 day | 41 day |
| 1 | H$_3$BO$_3$ (1) | 4.7 | 1.8 | <1 | <1 |
| 2 | 4Å Sieve (1) | 5.9 | <1 | <1 | 2.3 |
| 3 | 4Å Sieve (3) | <1 | <1 | <1 | <1 |
| 4 | — Control | 9.7 | 14.5 | 14.6 | 20.5 |

EXAMPLE 3

For this experiment 55 gallon drums of freshly prepared sealant were used. This product was similar to the product used in Experiment #1. Both contain hexamethyldisilazane which, upon reaction with reactive OH groups, generate ammonia gas.

Into the headspace of four separate drums was added:
(1) one pound of boric acid;
(2) three pounds of boric acid;
(3) one cloth bag containing one pound of 4 Å molecular sieves; and,
(4) three cloth bags, each containing one pound of 4 Å molecular sieves. These drums were sealed and analyzed periodically as per Example 2.

Table III lists the results. Again, all materials were effective at significantly lowering the concentration of ammonia to the head space.

TABLE III

| Drum # | Adsorbent (lbs.) | % Ammonia in headspace of 55 gal. drum | | | |
|---|---|---|---|---|---|
| | | 1 day | 16 day | 30 day | 64 day |
| 1 | H$_3$BO$_3$ (1) | 1.7 | 4.6 | 4.1 | 4.6 |
| 2 | H$_3$BO$_3$ (3) | 2.1 | 6.7 | 5.2 | <1 |
| 3 | 4Å Sieve (1) | 1.4 | <1 | <1 | <1 |
| 4 | 4Å Sieve (3) | <1 | <1 | <1 | <1 |

I claim:
1. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:
   (A) an organopolysiloxane wherein the silicon atom at each chain end is terminated with at least two alkoxy radicals;
   (B) an effective amount of condensation catalyst;
   (C) a stabilizing amount of a silicon-nitrogen compound for scavenging hydroxy radicals, said silicon-nitrogen compound releasing ammonia as a by-product of the hydroxy-scavenging reaction; and
   (D) an effective amount of a scavenger for said ammonia by-product selected from the group consisting of molecular sieves and acids and mixtures thereof.
2. The composition of claim 1 further comprising an effective amount of curing accelerator selected from the group consisting of substituted guanidines, amines and mixtures thereof.
3. The composition of claim 1 wherein the scavenger for ammonia is disposed in the airspace of a container above a mixture of the other ingredients.
4. The composition of claim 1 wherein the scavenger for ammonia is mixed with the other ingredients.
5. The composition of claim 1 wherein the scavenger for ammonia is a molecular sieve of from about 2 to about 15 Angstroms.
6. The composition of claim 1 wherein the scavenger for ammonia is a molecular sieve of from about 3 to about 13 Angstroms.
7. The composition of claim 1 wherein the scavenger for ammonia is a molecular sieve of from about 4 to about 5 Angstroms.
8. The composition of claim 1 wherein the scavenger for ammonia is a solid acid.
9. The composition of claim 1 wherein the scavenger for ammonia is selected from the group consisting of boric acid and oxalic acid.
10. The composition of claim 1 wherein the scavenger for ammonia is boric acid.
11. A method of making a one-package and substantially acid-free room temperature vulcanizable composition curable to the solid elastomeric state, which method comprises agitating under substantially anhydrous conditions at a temperature in the range of from about 0° C. to about 180° C., a room temperature vulcanizable material selected from
   (i) a mixture comprising:
      (A) 100 parts of a silanol terminated polydiorganosiloxane;
      (B) a stabilizing amount of a silicon-nitrogen compound for scavenging hydroxy radicals, said silicon-nitrogen compound releasing ammonia as a by-product of the hydroxy-scavenging reaction;
      (C) 0 to 10 parts of a crosslinking silane of the formula

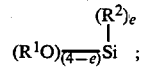

(D) an effective amount of a condensation catalyst; and
      (E) an effective amount of a scavenger for said ammonia by-product of the hydroxy-scavenging reaction selected from the group consisting of molecular sieves and acids and mixtures thereof; and
   (ii) a mixture comprising
      (A) 100 parts of a polyalkoxy-terminated polydiorganosiloxane base polymer;
      (B) 0 to 10 parts of a crosslinking silane of the formula

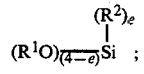

(C) an effective amount of a condensation catalyst;

(D) a stabilizing amount of a silicon-nitrogen compound for scavenging hydroxy radicals, said silicon-nitrogen compound releasing ammonia as a by-product of the hydroxy-scavenging reaction; and (E) an effective amount of a scavenger for said ammonia by-product of the hydroxy-scavenging reaction selected from the group consisting of molecular sieves and acids and mixtures thereof; where $R^1$ is a $C_{1\text{-}8}$ aliphatic organic radical selected from the group consisting of alkyl, alkylether, alkylester, alkylketone, and alkylcyano or a $C_{7\text{-}13}$ monovalent substituted or unsubstituted hydrocarbon radial, $R^2$ is a $C_{1\text{-}13}$ monovalent substituted or unsubstituted hydrocarbon radical, and e equals 0 or 1.

12. The method of claim 11 wherein the scavenger for hydroxy functional groups is selected from the group consisting of (A) non-cyclic silyl-nitrogen compounds of the formula

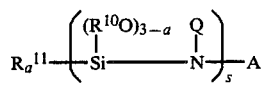

and (B) cyclic silyl-nitrogen compounds having at least one unit of the formula

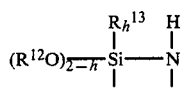

and the rest of the units, if any, having the formula

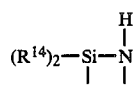

where $R^{10}$ and $R^{12}$ are $C_{1\text{-}8}$ aliphatic organic radicals selected from the group consisting of alkyl, alkylether, alkylester, alkylketone, alkylcyano and aryl; $R^{11}$, $R^{13}$ and $R^{14}$ are $C_{1\text{-}8}$ monovalent substituted or unsubstituted hydrocarbon radicals, a varies from 0 to 2, h is 0 or 1, s varies from 1 to 25, Q is selected from the group consisting of hydrogen, $C_{1\text{-}8}$ hydrocarbon radicals and radicals of the formula

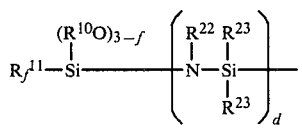

where d is a whole number that varies from 1 to 25 and f varies from 0 to 3; $R^{22}$ is selected from the group consisting of hydrogen and $C_{1\text{-}8}$ monovalent hydrocarbon radicals, and $R^{23}$ is independently selected from $C_{1\text{-}8}$ monovalent hydrocarbon radicals and hydrocarbonoxy radicals, A is selected from the group consisting of hydrogen and $C_{1\text{-}8}$ monovalent substituted and unsubstituted hydrocarbon radicals and radicals of the formula

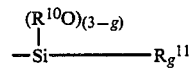

where $R^{10}$ is a $C_{1\text{-}8}$ aliphatic organic radical selected from the group consisting of alkyl, alkylether, alkylester, alkylketone, alkylcyano and aryl, $R^{11}$ is a $C_{1\text{-}8}$ monovalent substituted or unsubstituted or unsubstituted hydrocarbon radical, g varies from 0 to 3, and in the above scavengers there is at least one hydrocarbonoxy group in the molecule.

13. The method of claim 11 wherein the scavenger for ammonia is disposed in the airspace of a container above a mixture of the other ingredients.

14. The method of claim 11 wherein the scavenger for ammonia is a molecular sieve of from about 2 to about 15 Angstroms.

15. The method of claim 11 wherein the scavenger for ammonia is a molecular sieve of from about 3 to about 13 Angstroms.

16. The method of claim 11 wherein the scavenger for ammonia is a molecular sieve of from about 4 to about 5 Angstroms.

17. The method of claim 11 wherein the scavenger for ammonia is a solid acid.

18. The method of claim 11 wherein the scavenger for ammonia is selected from the group consisting of boric acid and oxalic acid.

19. The method of claim 11 wherein the scavenger for ammonia is boric acid.

20. In a method for making a one-package and substantially acid free room temperature vulcanizable composition curable to the solid elastomeric state, which method comprises agitating under substantially anhydrous conditions at a temperature in the range of from about 0° C. to about 180° C., a room temperature vulcanizable material comprising a mixture of:

(A) 100 parts of a silanol-terminated or polyalkoxy-terminated polydiorganosiloxane;

(B) a stabilizing amount of a silicon-nitrogen compound for scavenging hydroxy radicals, said silicon-nitrogen compound releasing ammonia as a by-product of the hydroxy-scavenging reaction;

(C) 0 to 10 parts of a crosslinking silane of the formula

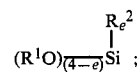

(D) an effective amount of a condensation catalyst; and (E) 0 to 5 parts of a curing accelerator selected from the group consisting of substituted guanidines, amines and mixtures thereof;

where $R^1$ is a $C_{1\text{-}8}$ aliphatic organic radical selected from the group consisting of alkyl, alkylether, alkylester, alkylketone, and alkylcyano or a $C_{7\text{-}13}$ monovalent substituted or unsubstituted hydrocarbon radical, $R^2$ is a $C_{1\text{-}13}$ monovalent substituted or unsubstituted hydrocarbon radical, and e equals 0 or 1; the improvement comprising adding to the composition or placing in the airspace of a container having said composition therein an effective amount of a scavenger for said ammonia by-product of the hydroxy-scavenging reaction selected from the group consisting of molecular sieves and acids, and mixtures thereof.

21. The composition of claim 1 wherein the scavenger for hydroxy functional groups is a silicon-nitrogen compound having at least two structural units of the formula

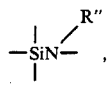

such nitrogen-containing structural groups comprising from 3 to 100 mole percent of the scavenger for hydroxy functional groups, and from 0 to 97 mole percent chemically combined structural units represented by the formula

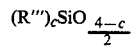

where the silicon atoms of said silicon-nitrogen compound are joined to each other by a member selected from an SiOSi linkage and an SiNR''Si linkage, the free valences of said silicon atoms other than those joined to oxygen to form a siloxy unit and to nitrogen to form a silazy unit are joined to a member selected from an R''' radical and an (R'')$_2$N radical, and where the ratio of the sum of said R''' radicals and said (R'')$_2$N radicals to the silicon atoms of said silicon-nitrogen compound has a value of 1.5 to 3.5 inclusive, and R'' is a member selected from the group consisting of hydrogen, monovalent hydrocarbon radicals and monovalent fluoroalkyl radicals, R''' is a member selected from the group consisting of hydrogen, monovalent hydrocarbon radicals and monovalent fluoroalkyl radicals, and c is a whole number equal to 0 to 3, inclusive.

22. The method of claim 11 wherein the scavenger for hydroxy functional groups is a silicon-nitrogen compound having at least two structural units of the formula

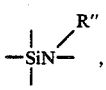

such nitrogen-containing structural groups comprising from 3 to 100 mole percent of the scavenger for hydroxy functional groups, and from 0 to 97 mole percent chemically combined structural units represented by the formula

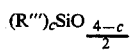

where the silicon atoms of said silicon-nitrogen compound are joined to each other by a member selected from an SiOSi linkage and an SiNR''Si linkage, the free valances of said silicon atoms other than those joined to oxygen to form a siloxy unit and to nitrogen to form a silazy unit are joined to a member selected from an R'' radical and an (R'')$_2$N radical, and where the ratio of the sum of said R''' radicals and said (R'')$_2$N radicals to the silicon atoms of said silicon-nitrogen compound has a value of 1.5 to 3.5 inclusive, and R'' is a member selected from the group consisting of hydrogen, monovalent hydrocarbon radicals and monovalent fluoroalkyl radicals, R''' is a member selected from the group consisting of hydrogen, monovalent hydrocarbon radicals and monovalent fluoroalkyl radicals, and c is a whole number equal to 0 to 3, inclusive.

23. In a stable, one-package, substantially anhydrous and substantially acid-free room temperature vulcanizable organopolysiloxane composition stable under ambient conditions in the substantial absence of moisture over an extended period of time and convertible to a tack-free elastomer, having an organopolysiloxane, a condensation catalyst and a compound which releases ammonia, the improvement which comprises having present in said composition an effective amount of scavenger for ammonia selected from the group consisting of molecular sieves, acids and mixtures thereof.

24. The composition of claim 23 wherein the scavenger for ammonia is a molecular sieve of from about 2 to about 15 Angstroms.

25. The composition of claim 23 wherein the scavenger for ammonia is a molecular sieve of from about 3 to about 13 Angstroms.

26. The composition of claim 23 wherein the scavenger for ammonia is a molecular sieve of from about 4 to about 5 Angstroms.

27. The composition of claim 23 wherein the scavenger for ammonia is an acid.

28. The composition of claim 27 wherein the acid scavenger for ammonia is boric acid or oxalic acid.

29. The composition of claim 27 wherein the acid scavenger for ammonia is boric acid.

30. The composition of claim 23 wherein the scavenger for ammonia is admixed with the silicone composition which releases ammonia.

31. The composition of claim 23 wherein the scavenger for ammonia is disposed in the airspace of a container which contains the silicone composition which releases ammonia.

32. In a method for eliminating ammonia in stable, one-package, substantially anhydrous and substantially acid-free room temperature vulcanizable organopolysiloxane compositions stable under ambient conditions in the substantial absence of moisture over an extended period of time and convertible to a tack-free elastomer, having an organopolysiloxane, a condensation catalyst and a compound which releases ammonia, the improvement which comprises adding an effective amount of scavenger for ammonia selected from the group consisting of molecular sieve, acids and mixtures thereof.

33. The method of claim 32 wherein the scavenger for ammonia is a molecular sieve of from about 2 to about 15 Angstroms.

34. The method of claim 32 wherein the scavenger for ammonia is a molecular sieve of from about 3 to about 13 Angstroms.

35. The method of claim 32 wherein the scavenger for ammonia is a molecular sieve of from about 4 to about 5 Angstroms.

36. The method of claim 32 wherein the scavenger for ammonia is an acid.

37. The method of claim 36 wherein the acid scavenger for ammonia is boric acid or oxalic acid.

38. The method of claim 36 wherein the acid scavenger for ammonia is boric acid.

39. The method of claim 32 wherein the scavenger for ammonia is admixed with the silicone composition which releases ammonia.

40. The method of claim 32 wherein the scavenger for ammonia is disposed in the airspace of a container which contains the silicone composition which releases ammonia.

* * * * *